US008781999B2

(12) United States Patent
Janakiraman

(10) Patent No.: US 8,781,999 B2
(45) Date of Patent: Jul. 15, 2014

(54) EXPLORER STYLE FILE VIEWER FOR A GROUP OF MACHINES WHICH DISPLAY META VIEWS OF FILES ON A GROUP OF MACHINES

(75) Inventor: Janani Janakiraman, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 2960 days.

(21) Appl. No.: 11/089,395

(22) Filed: Mar. 24, 2005

(65) Prior Publication Data

US 2006/0218150 A1      Sep. 28, 2006

(51) Int. Cl.
*G06F 7/00* (2006.01)
(52) U.S. Cl.
USPC ............................................... 707/609
(58) Field of Classification Search
USPC .................................. 707/104.1, 10, 100
See application file for complete search history.

(56) References Cited

U.S. PATENT DOCUMENTS

| | | | | |
|---|---|---|---|---|
| 4,961,224 A * | 10/1990 | Yung | ................................. | 726/4 |
| 5,230,048 A * | 7/1993 | Moy | ..................................... | 1/1 |
| 6,181,342 B1 * | 1/2001 | Niblack | ......................... | 345/635 |
| 6,823,348 B2 * | 11/2004 | Benayoun et al. | ..................... | 1/1 |
| 7,243,103 B2 * | 7/2007 | Murphy et al. | ........................ | 1/1 |
| 7,257,604 B1 * | 8/2007 | Wolfe | ..................................... | 1/1 |
| 7,272,625 B1 * | 9/2007 | Hannel et al. | ................. | 709/200 |
| 2003/0220946 A1 * | 11/2003 | Malik | ............................ | 707/203 |
| 2004/0193600 A1 * | 9/2004 | Kaasten et al. | .................... | 707/7 |
| 2006/0117010 A1 * | 6/2006 | Hakala | .............................. | 707/9 |

* cited by examiner

*Primary Examiner* — Hosain Alam
*Assistant Examiner* — Eliyah S Harper
(74) *Attorney, Agent, or Firm* — Yee & Associates, P.C.; Jeffrey S. LaBaw

(57) ABSTRACT

A system and method for identifying and presenting various views of files of a set of computers. In one preferred embodiment, the present invention presents a user with an explorer type interface that allows a user to view, for example, all computers of a network, and to select particular ones of the computers for analysis. The present invention allows a user to select specific computers and compare, for example, all files that are common to all those computers, or to display all files unique to each of those computers. In a preferred embodiment, the present invention also allows the user to take action on the presented information, such as to apply a common security policy to the group of machines.

20 Claims, 7 Drawing Sheets

EXPLORER STYLE FILE VIEWER FOR A GROUP OF MACHINES WHICH DISPLAY META VIEWS OF FILES ON A GROUP OF MACHINES

BACKGROUND OF THE INVENTION

1. Technical Field

The present invention relates generally to computer systems, and particularly to a system and method of identifying common and unique files to a group of machines and presenting the identified files to a user.

2. Description of Related Art

A file system is used for storing and retrieving files from a storage device in a data processing system. A file system defines the directory structure for keeping track of files and metadata required to access those files. Further, a file system also defines the way files are named as well as the size of a file or volume.

The typical structure used in current file systems is a directory tree structure. In a tree structure, data files are organized in a hierarchical format and displayed for viewing. Microsoft Windows is an example of a file system that organizes files into a tree structure using directories. Directories are often referred to as folders, and may contain files or other directories. Within the tree structure, a user may select and manipulate files represented by members within the tree utilizing a mouse, keyboard or other input device. User selection via a mouse can be accomplished by "pointing and clicking" on a selectable feature on the computer display.

In addition to using a file system to view files contained on a particular computer, current file systems also allow users to view files across machines in a computer network or in a "network neighborhood". However, as users may subsequently access the content of multiple computers in the network, system administrators may desire to limit or deny a user's access to certain files. One product available to system administrators for limiting a user's access to certain files in the network is IBM Tivoli Access Manager for Operating Systems (AMOS), which permits an administrator to set a "common" security policy on a group of machines. IBM Tivoli Access Manager for Operating Systems provides a layer of authorization policy enforcement in addition to that provided by the native operating using fine-grained access controls (e.g., controls based on user identity, group membership, type of operation, time of day or day of week, and accessing application) that restrict or permit access to key system resources. Machines in the network may require the same or similar authorization policy since they are used for the same or similar purposes, and the policy may be grouped for similar machines under user-defined policy branches. Machines are configured to subscribe to a particular policy branch, and all machines subscribing to the same policy branch are subject to the same authorization policy.

One problem that exists with defining security policies is that presently there is no way to analyze and correlate resources across the various machines in the network. Currently available file viewing mechanisms, such as Windows Explorer on Windows-based computers and File Viewer on Unix-based computers, may display the files contained in each machine to the user. However, these existing viewing mechanisms lack an automated tool that compares resources across the machines in the network to determine the subset of resources that are common or unique to the machines. Identifying common files among the machines in the network and then applying a common set security policy would help limit the size of the central policy database, as well as making the administration of the policy applicable to the files easier. Thus, having a way to view and analyze the files on various computers in a system and to present consolidated views would be beneficial in performing such tasks as setting common security policies and other administrative tasks.

Therefore, it would be advantageous to have an improved method of identifying the resources that are common or unique to the machines in a network and presenting this consolidated information to users via a file system.

SUMMARY OF THE INVENTION

The present invention teaches a system and method for identifying and presenting various views of files of a set of computers. The present invention provides a mechanism for identifying the resources that are common or unique to the machines in a network. Once these common/unique resources are identified, this consolidated information may be presented to users via a file system.

In one preferred embodiment, the present invention presents a user with a tree type interface that allows a user to view, for example, all computers of a network, and to select particular ones of the computers for analysis. A user may select a specific group of computers and compare, for example, all files that are common to the selected computers, or to display all files unique to each of those computers within the selected group. In a preferred embodiment, the present invention also allows the user to take action on the presented information, such as to apply a common security policy to the group of machines. For example, security policies may include granting application specific administrators access to files pertaining to the application and providing uniform protection for system log files. Further, in preferred embodiments, a user may create custom views that can be configured to display a user-defined view, such as all files for which a particular user is the owner.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
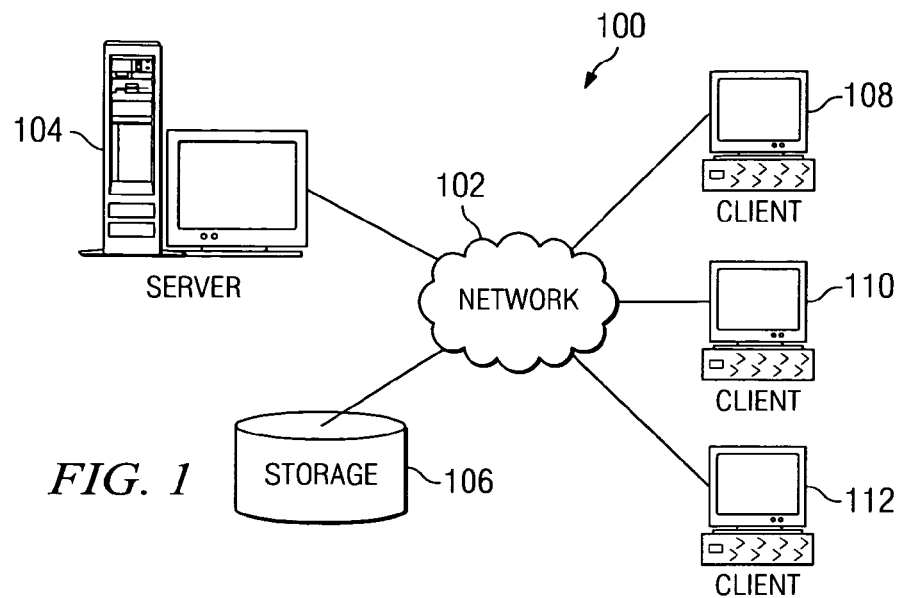
FIG. 1 depicts a pictorial representation of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
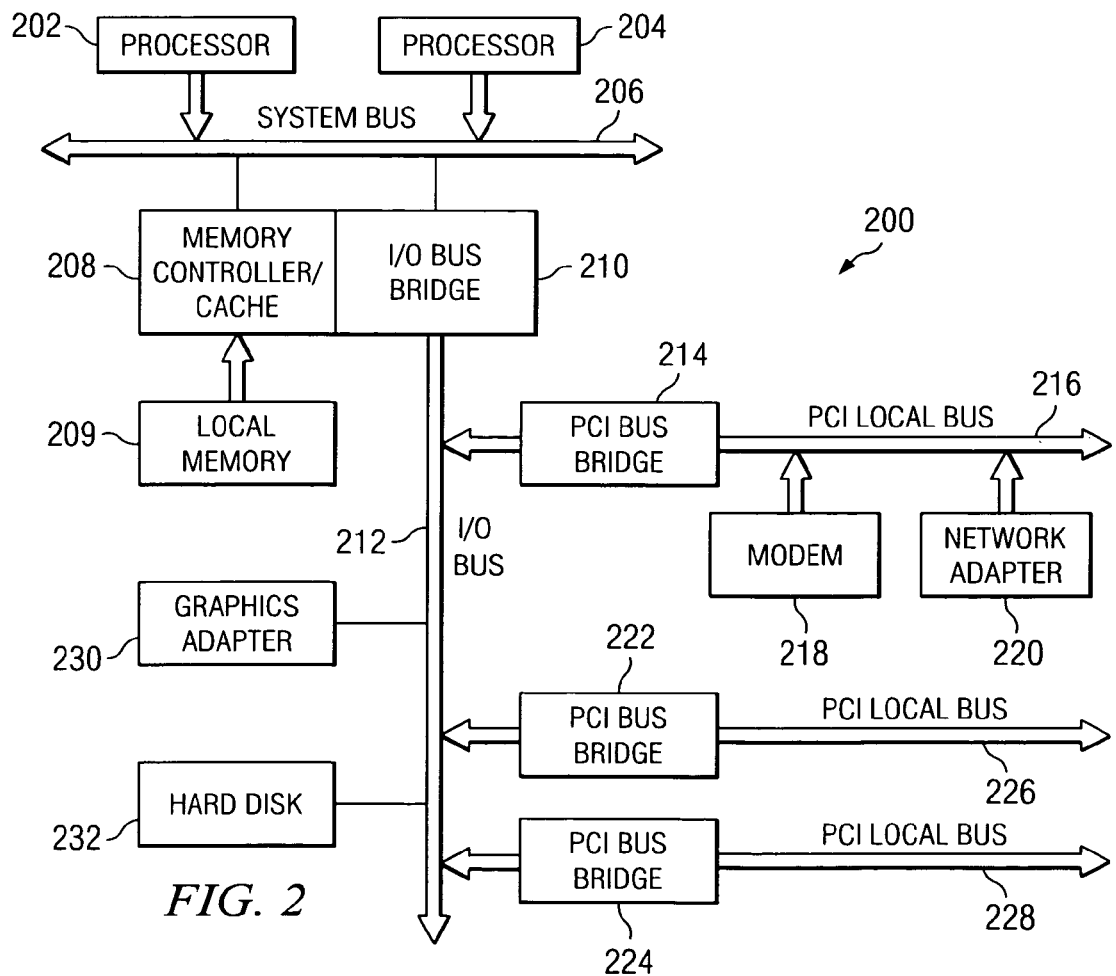
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
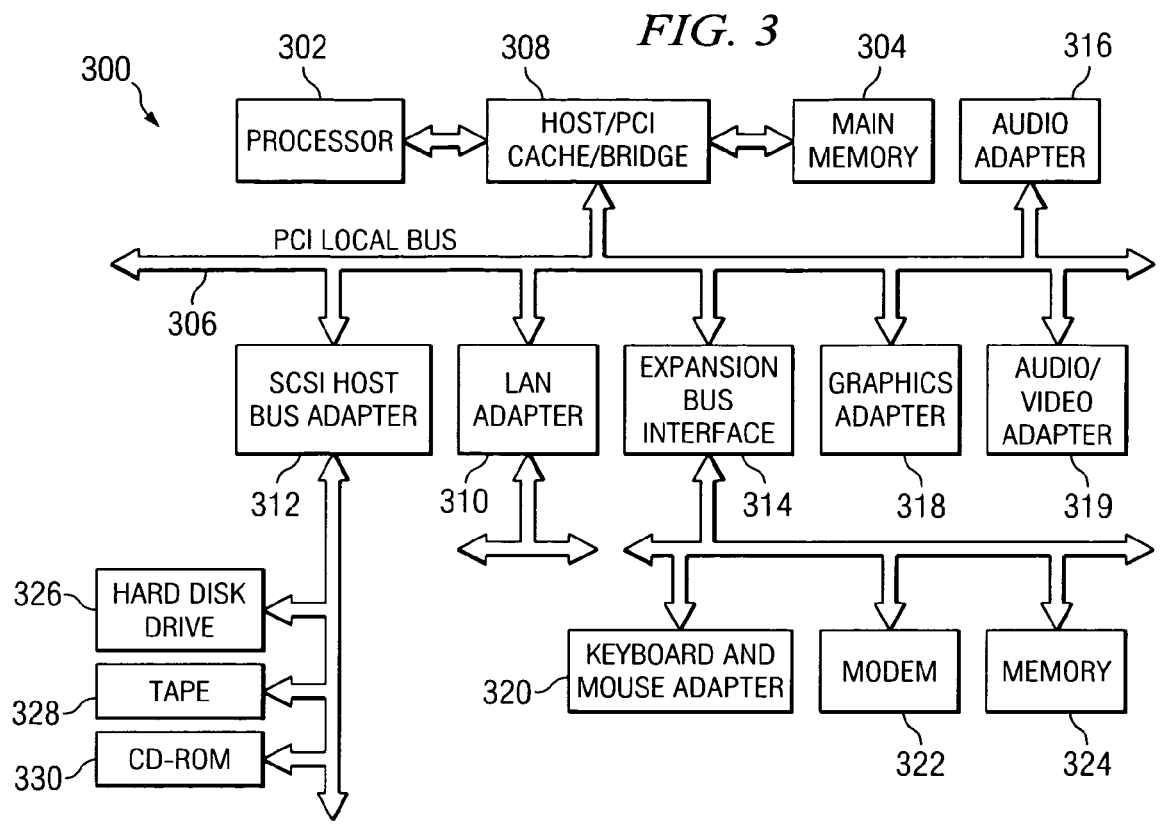
FIG. 3 is a block diagram of a data processing system that may be implemented as a client in accordance with a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method and system for identifying resources that are common or unique to the machines in a network, and presenting this consolidated information to users via a file system. Once particular advantage of providing users with a way to view and analyze the similarities and differences among files on various computers in a system is that this information may be used when performing administrative tasks, such as setting common security policies. For instance, providing a mechanism for identifying which files are common among the machines in the network enables users to apply a common set security policy. In an environment where the security policy is stored in a central policy database, the ability to apply a common set security policy on files across machines will enable limiting the size of the central policy database, as well as making the administration of the policy applicable to the files easier (e.g., identifying and presenting files in an easily understood format allows discovery of potentially problematic files, such as a file that is not compatible with a particular type of software). A similar analysis may also be performed on a smaller subset of machines, such that smaller common subsets may be identified to help optimize the number of security policy definitions needed for securing the resources on the computers. Thus, the present invention allows a user or administrator to easily discover and compare the various files on selected computers of a set of computers. Similarly, the list of unique files in a group of machines helps the security administrator identify the files on which a special policy should be set.

A common file may include those files that are common among selected machines in the network. For example, computer 1 contains files A, B, and C; computer 2 contains files B, C, and D; and computer 3 contains file C. If the user selects to view all of the files that are common to the computers, only file C will be displayed to the user. In contrast, if the user selects to view the files that are unique to the computers, only file A on computer 1 and file B on computer 2 will be displayed. A user may also further define the common file display by selecting a common file sub-type. The common file sub-type allows the user to select whether to display only those common files found in the same path name on each machine, to rather to display all common files in the machines regardless of the path name.

In a preferred embodiment, the mechanism of the present invention presents a user with a tree type interface that allows a user to view, for example, all computers of a network, and to select particular ones of the computers for analysis. For instance, a utility such as a window file browser may be used as an interface, wherein the utility includes a tree structure for viewing files that can present different views of a file system space (such as selected computers of a local area network, or other set of computers) for a selected group of machines as set by the user.

With the interface, a user may select a specific group of computers for comparison, wherein the files in the group of computers are compared against one another. The user may select how the files of the selected computers are to be compared and viewed. For example, in one embodiment, a user can choose to display all files that are common among the selected machines. In another embodiment, a user can choose to display all files that are unique to each of the selected machines.

The comparison performed by the mechanism of the present invention may identify similar and different files based on file name. For example, when identifying common files, a particular file may be identified as being resident on multiple machines, even if the path name of the file is different on each machine. For instance, even though an application configuration file "app1.conf" exists in different directories on various machines based on each machine's operating system, this file may still be identified on each machine based on the file name. Alternatively, files may also be identified based on file metadata, such as file type, ownership rights, or access rights. File may also be identified by a combination of both file name and file metadata.

Once the consolidated information has been presented to the user, the user may take action on the information, such as to apply a common security policy to the group of machines or a central database. The list of identified files may be used as input for the policy. For instance, using the application configuration file "app1.conf" as an example, a common security policy may be applied to the group of machines or central database by applying a security policy to the configuration file. Based on the requested task, any known security policy mechanism may be used to apply the common security policy. Security policies may include granting application specific administrators access to files pertaining to the application and providing uniform protection for system log files.

Figure 4:
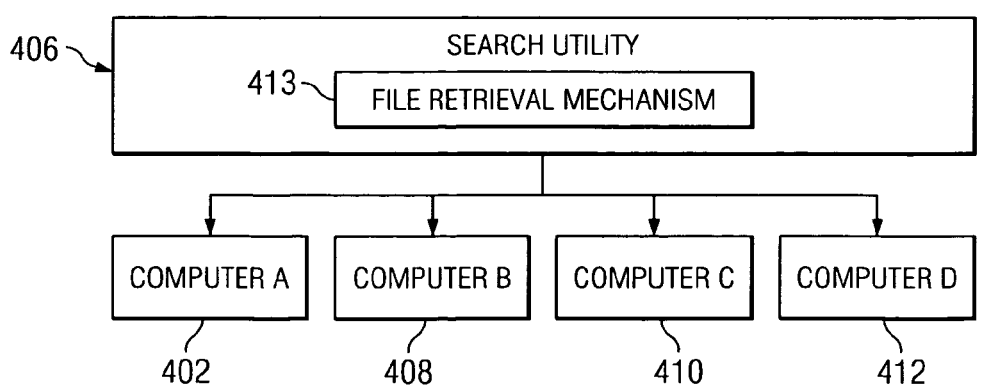
FIG. 4 is a block diagram illustrating exemplary components used to identify and present various views of resources that are common or unique to the machines in a network in accordance with a preferred embodiment of the present invention.

Turning now to FIG. 4, a block diagram illustrating exemplary components used to identify and present various views of resources that are common or unique to the machines in a network in accordance with a preferred embodiment of the present invention is shown. The components shown in FIG. 4 may be implemented in a network of computers, such as, for example, network data processing system 100 in FIG. 1.

A user at a computer in the network, such as computer A 402, may obtain information regarding the data resources contained in the machines in the network. Search utility 406 may be located within a server, such as server 200 in FIG. 2, or may also be located in within any of the other computers in the network, such as, in this example, computers A 402, B 408, C 410, or D 412. Search utility 406 gathers information about the files contained within selected computers in the network. This information may include, but is not limited to, gathering the names of each file and the data type of the files. In this illustrative example, search utility 406 is shown to contain file retrieval mechanism 413, which is used to obtain the file information. Alternatively, search utility may comprise a filtering mechanism or a comparison engine. The filtering mechanism may gather file information by filtering based on a user specified file selection criteria. For example, the user specified file selection criteria may select files for which user X is an owner. The comparison engine may obtain file information by comparing the files in the network to identify common or unique files based on the user selection.

Search utility 406 may obtain information about the files by querying the files in the selected computers one by one to determine if the file exists on the other selected computers. Alternatively, search utility 406 may gather information about the files by downloading the file lists on each machine, wherein the file lists may be queried by the search utility.

When search utility 406 obtains the file information from the various computers, search utility 406 performs functions on the data, such as comparing the files to identify files common or unique to the computers. Alternatively, search utility 406 may also perform a function on the data based on user-defined file selection options, thereby allowing for customization of criteria used in selecting files from the group of computers.

This information relating to the files is then presented to the user, in this case, the user at computer A 402. The particular files in the group of computers that are displayed to the user depend upon what information has been requested by the user. This is described more fully in FIG. 5 below.

Figure 5:
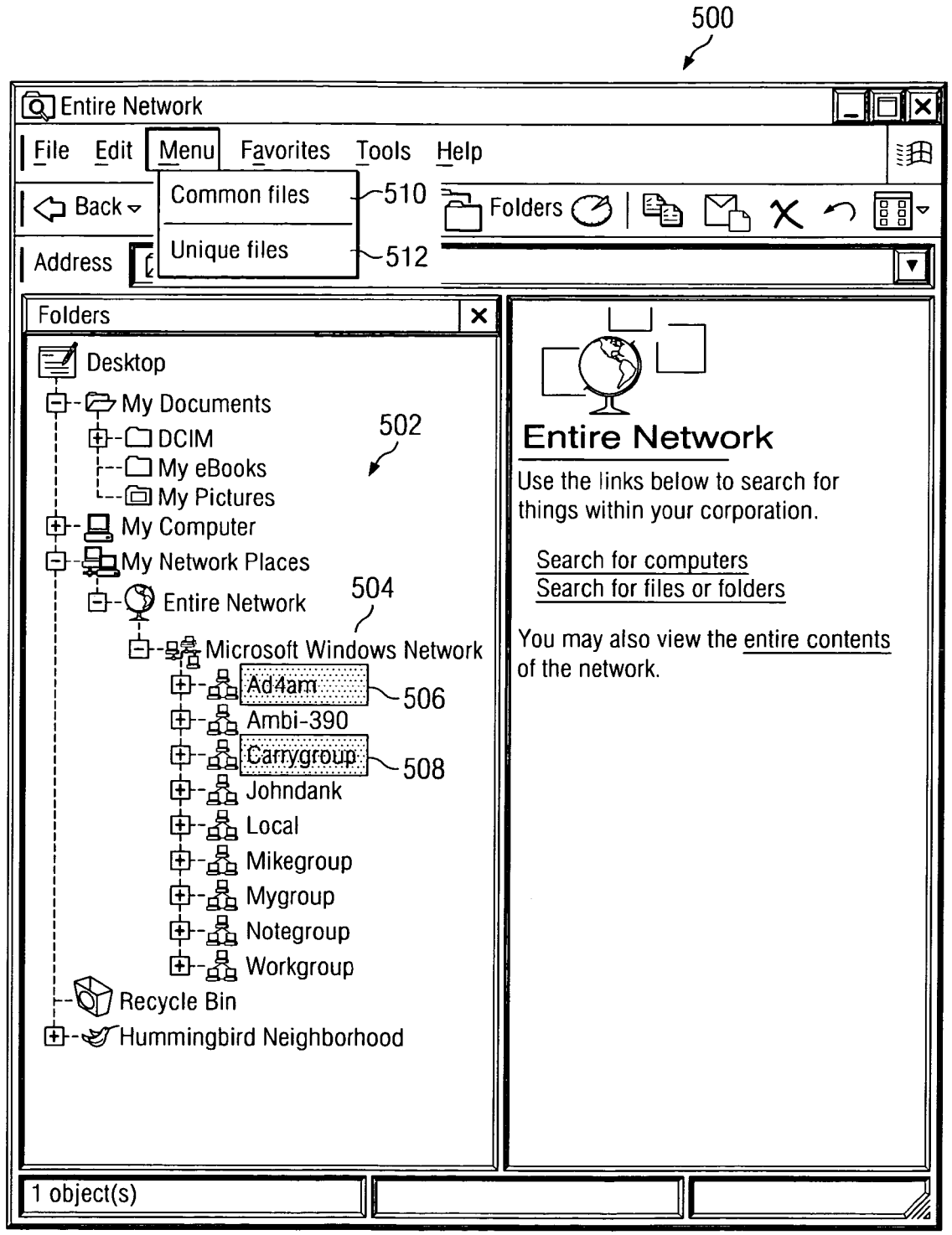
FIG. 5 is an example of a graphical user interface that allows for selecting computers and desired files in accordance with a preferred embodiment of the present invention.

FIG. 5 illustrates examples of different options available to a user for selecting files to be presented in accordance with a preferred embodiment of the present invention. Although FIG. 5 is shown in a Microsoft Windows environment, the present invention may be used in any software program to select and display data using any tree metaphor.

Window 500 in FIG. 5 illustrates the data resources in a network of computers. Window 500 comprises a tree structure, such as tree structure 502, having many branches and many levels to each branch in the tree structure. In this illustrative example, tree structure 502 includes a list of the computers in the network, such as the list of computers in Microsoft Windows Network directory 504. A user may select specific computers from tree structure 502 for which the user wants to view the files. For example, as shown, computer Ad4am 506 and computer Carrygroup 508 have been selected for viewing by the user.

In addition to selecting specific computers for viewing, a user may also select, in window 500, how files of the selected computers may be presented. For example, window 500 may include options selectable by the user, such as menu options "Common Files" 510 or "Unique Files" 512. Although the menu options available to the user are shown at the top of window 500, these user options may be shown to the user in any location in window 500. Selecting one of these options will determine how the files of the selected computers Ad4am 506 and Carrygroup 508 are compared and presented.

In another embodiment, a user may also be allowed to select a "user-defined view" menu option. A user-defined view option is a user-configured option that permits a user to customize the parsing and presentation of files from the subject computers. A user may specify parameters to determine what files are presented to the user, e.g., by creating a Boolean operation or selecting a pre-configured option from a sub-menu. For example, a user may configure a user-defined view to show all files in the group of selected computers for which a particular user has "read" permission. In this case, a calculation is performed on each file of the selected machines to determine if the particular user has read permission to the file. Prior art tools that perform a "user entitlement" report on a single machine may thus be extended to a group of machines.

Figure 6A:
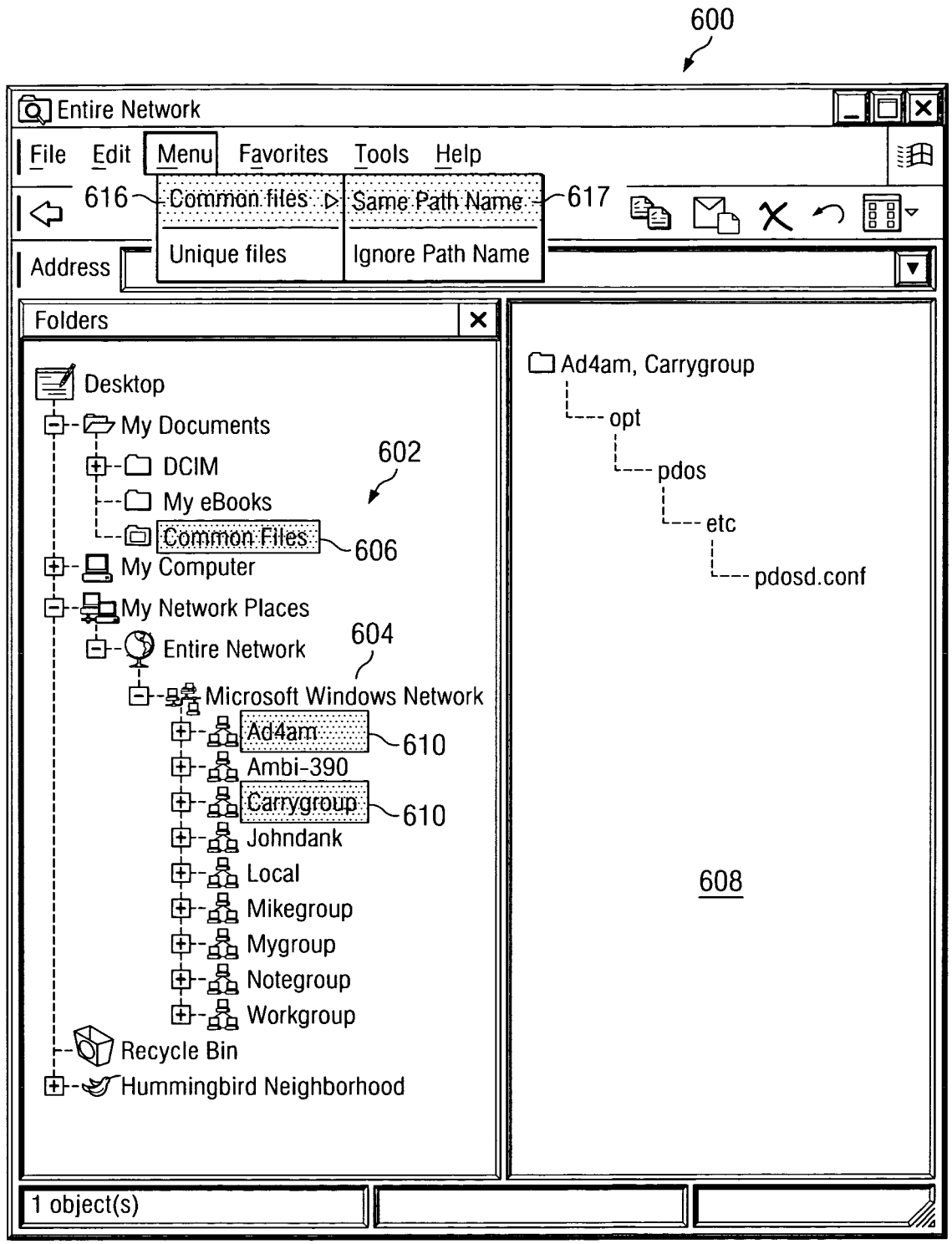
FIGS. 6A-6C are examples of a graphical user interface that allows for presenting identified files of selected computers in accordance with a preferred embodiment of the present invention.
Figure 6B:
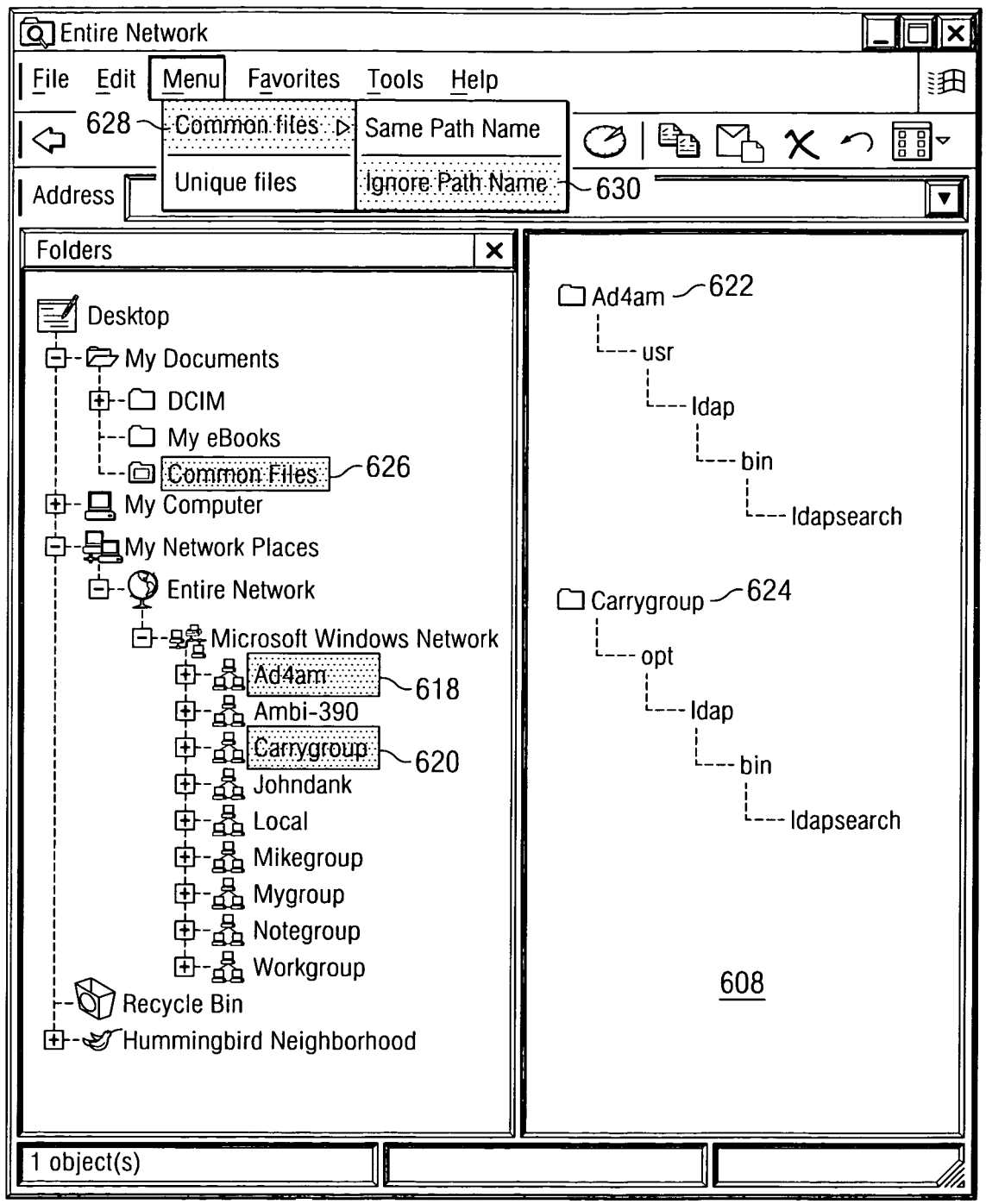
Figure 6C:
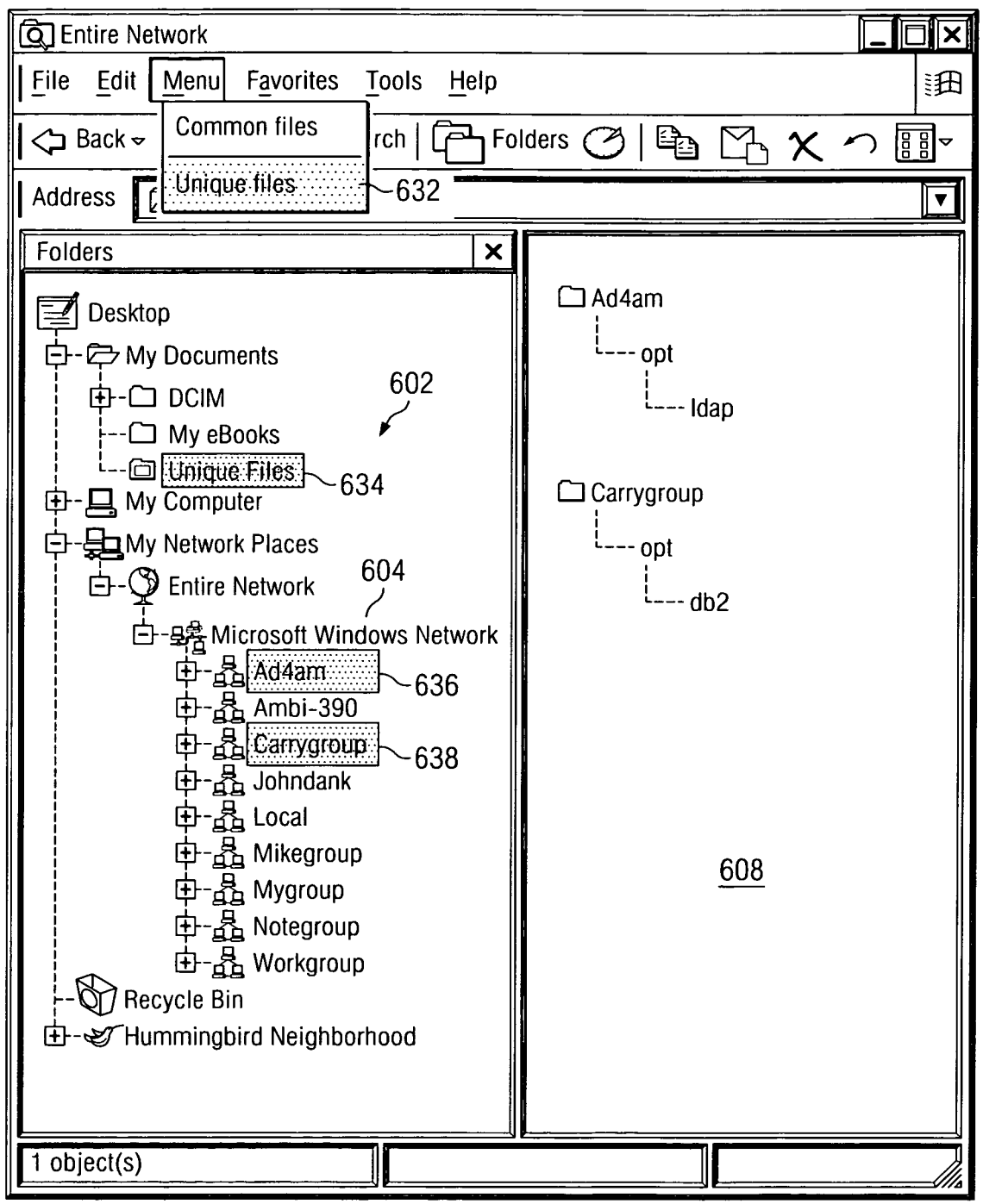

FIGS. 6A-6C are examples of a graphical user interface that allows for presenting identified files of selected computers in accordance with a preferred embodiment of the present invention. Window 600 is presented to the user once the user has selected the particular computers for viewing and the user has selected the type of files to be displayed (e.g., files common to the selected machines, files unique to the selected machines, etc.).

The particular examples in FIG. 6A illustrates an embodiment wherein the common files option, such as Common Files menu option 616, has been selected. Tree structure 602 includes a list of the computers in the network, such as the list of computers in Microsoft Windows Network directory 604. As shown, tree structure 602 includes a common files directory 606. When the user selects common files directory 606 and expands the tree structure, the files common to the selected computers on each machine will be shown in display area 608.

A user may select two different views of common files, as shown in display area 608 in FIGS. 6A and 6B. If the user selects common files option 616 and sub-menu same path name 617, common files that are located in the same path on each machine may be shown in display area 608 as part of the same folder in common files directory 606. For example, file "pdosd.conf" in computer Ad4am is located in the opt/pdos/etc directory. Likewise, file "pdosd.conf" in computer Carrygroup is also located in the opt/pdos/etc directory. As the "pdosd.conf" files in both computer Ad4am and Carrygroup have the same path name, the identified common "pdosd.conf" file may be presented in one directory (Ad4am, Carrygroup directory 610) under expanded common files directory 606, such as in the following manner:

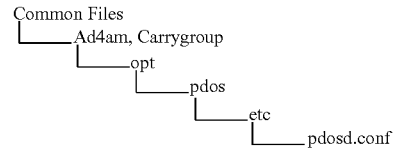

However, if the user desires to view files common to the selected machines even if these common files may be located in different directories (i.e., different path names), multiple tabs for each machine may be used. The particular example in FIG. 6B illustrates an embodiment wherein the common files option 628 with sub-menu Ignore path name 630 is selected. For example, "ldapsearch" in computer Ad4am 618 is located in the usr/ldap/bin directory. In contrast, file "ldapsearch" in computer Carrygroup 620 is located in the opt/ldap/bin directory. As the "ldapsearch" files in computers Ad4am and Carrygroup have different path names, the identified common "ldapsearch" file may be presented in different directories (Ad4am directory 622 and Carrygroup directory 624) within expanded common files directory 626, such as in the following manner:

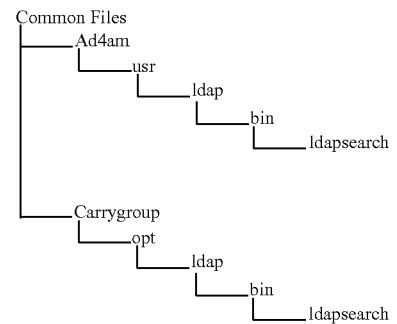

FIG. 6C illustrates an embodiment wherein the unique files option, such as Unique Files menu option 632, has been selected. As shown, tree structure 602 includes a unique files directory 634. When the user selects unique files directory 634 and expands the tree structure, the files unique to the selected computers on each machine will be shown in display area 608.

If the user selects unique files option 632, files that are unique to the group of selected machines may be shown in display area 608 as part of the same folder in unique files directory 634. For example, if computer Ad4am 636 contains a DB2 application installed in the /opt/db2 directory and a Web server installed in the /opt/http directory, and computer Carrygroup 638 contains a Web server installed in the /opt/http directory and an LDAP server installed in the /opt/ldap directory, the file identified as unique to the selected Ad4am and Carrygroup machines may be presented under expanded unique files directory 634, such as in the following manner:

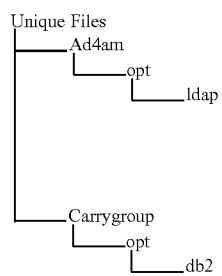

In other embodiments, the user may desire to compare the files in another way to identify similarities and differences, and display those similarities or differences in various formats, such as a tree format. These identified files may be displayed in a manner consistent with the display formats shown above.

Figure 7:
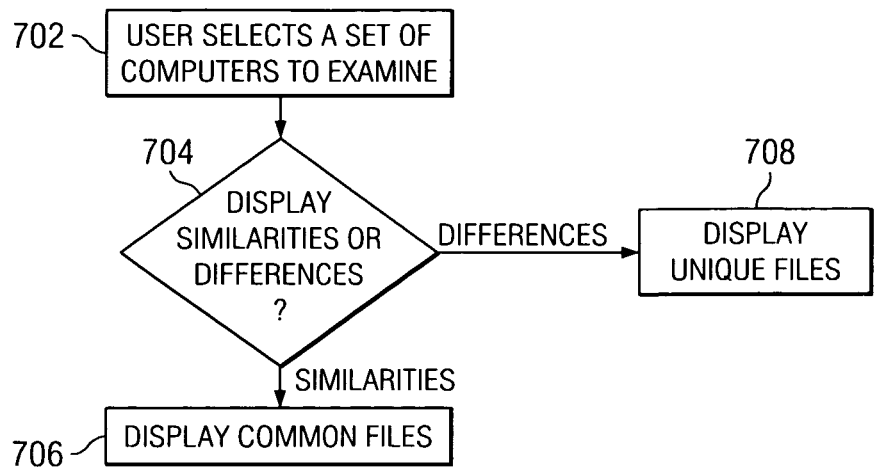
FIG. 7 shows a flowchart with process steps for selecting the type of files for display in accordance with a preferred embodiment of the present invention.

FIG. 7 shows a flowchart with process steps for selecting the type of files for display in accordance with a preferred embodiment of the present invention. The process described in FIG. 7 may be implemented in a browser or other application, such as Explorer in a Windows operating system environment.

The process begins with a user selecting a set of computers in a network for examination (step 702). Next, the user chooses whether to have the system display similarities or differences among the files of the selected computers (step 704). If the user selects to have the common files displayed, the innovative system compares the files of the selected computers and displays to the user (preferably in a window format or a tree format) the common files that are present on all selected computers (step 706). This display may be presented in a single directory under a common files directory if the identified common files are located in the same path on each selected machine, or in separate directories for each under the common files directory if the identified common files are located in different paths on the selected machines. If the user selects to have the system display the files unique to each of the selected computers, then the identified unique files for the selected computers are displayed to the user (preferably in a window format or a tree format) (step 708). Each selected computer having unique files may be shown under unique files directory, wherein the path name of the unique files may also be presented to the user.

Figure 8:
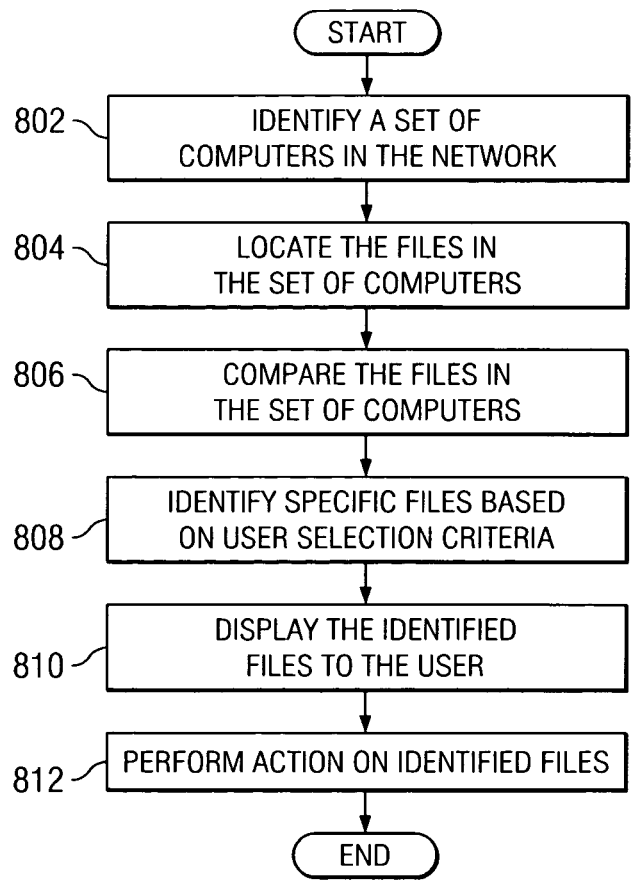
FIG. 8 shows a flowchart with process steps for identifying and displaying specific files located within a group of selected computers in accordance with a preferred embodiment of the present invention.

FIG. 8 shows a flowchart with process steps for identifying and displaying specific files located within a group of selected computers in accordance with a preferred embodiment of the present invention. The process described in FIG. 8 may be implemented in a data processing system, such as computer 402 in FIG. 4.

The process begins with the identification of a group of computers for examination (step 802). Next, the mechanism of the present invention locates the files present on each computer in the selected group (step 804). For example, search utility 406 described in FIG. 4 may be used to scan the operating system of each computer in the group and query each computer's files one by one. Alternatively, the search utility on the client machine may retrieve portions of the file space on the secondary computers in the group and place this file space on the client machine. The search utility may then perform the query of the files on the client machine.

Next, the system compares the file sets (step 806) and, according to the user-specified criteria, identifies specific files in the sets (step 808). These identified files are then displayed to the user (step 810). For instance, if the user has selected to view only those files that are common to the group of computers, the common files identified by the search utility are displayed to the user. This display of common files is preferably in a manner consistent with the displays shown in FIG. 6A or 6B, depending upon whether the user selected to view all common files or only those files having the same path name on each machine. If the user has selected to view files that are unique in the group of computers, the unique files identified by the search utility are displayed to the user.

In an optional step, when the display is presented to the user, the user may take action on the identified set of common or unique files (step 812). This action may include performing an administrative task on the group of machines, such as setting a common security policy on the identified files.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for correlating resources across computers in a computer network for display, the method comprising:
   identifying a set of computers within the computer network;
   examining each computer in the set of computers to locate files that are present on the set of computers to form a plurality of located files;
   comparing files of the plurality of located files to identify files of the plurality of located files that are present on a plurality of the computers of the set of computers, and to identify files of the plurality of located files that are present on only one of the computers of the set of computers; and displaying a selected one of the files of the plurality of located files that are present on a plurality of the computers of the set of computers or the files of the plurality of located files that are present on only one of the computers of the set of computers.

2. The method of claim 1, further comprising:

performing an administrative task on one of the set of computers or a centralized database, wherein the identified files are used as input for the administrative task.

3. The method of claim 2, wherein the administrative task comprises applying a common security policy to the set of computers or a centralized database.

4. The method of claim 1, further comprising:

receiving a user input indicating the selected one of the files of the plurality of located files that are present on a plurality of the computers of the set of computers or the files of the plurality of located files that are present on only one of the computers of the set of computers to be displayed.

5. The method of claim 1, wherein displaying a selected one of the files of the plurality of located files that are present on a plurality of the computers of the set of computers or the files of the plurality of located files that are present on only one of the computers of the set of computers, comprises:

displaying the selected one of the files of the plurality of located files that are present on a plurality of the computers of the set of computers or the files of the plurality of located files that are present on only one of the computers of the set of computers in a tree format.

6. The method of claim 1, wherein the files are identified based on at least one of file name and file metadata.

7. The method of claim 3, wherein applying the common security policy includes one of granting application-specific administrators access to files pertaining to an application or providing uniform protection for system log files.

8. The method of claim 1, wherein the examining is performed using a search utility, and wherein the search utility comprises one of a file retrieval mechanism, comparison engine, or a filtering mechanism.

9. The method of claim 8, wherein the search utility examines the set of computers by one of scanning a file system of each computer of the set of computers and querying files one by one, or by retrieving portions of a file space on secondary computers in the set of computers, placing the file space on a client computer, and querying the files on the client computer.

10. The method of claim 1, wherein the files of the plurality of located files that are present on a plurality of the computers of the set of computers, comprise files of the plurality of located files that are also located in a same path on each of the computers of the set of computers.

11. The method of claim 1, wherein displaying a selected one of the files of the plurality of located files that are present on a plurality of the computers of the set of computers or files of the plurality of located files that are present on only one of the computers of the set of computers, comprises displaying a selected one of the files of the plurality of located files that are present on a plurality of the computers of the set of computers or files of the plurality of located files that are present on only one of the computers of the set of computers in a display window.

12. The method of claim 1, further comprising:

receiving user input identifying the set of computers.

13. A computer program product, comprising:

a non-transitory computer readable storage medium storing computer usable program code executable by a processor for correlating resources across computers in a computer network for display, the computer program product comprising:

program code for identifying a set of computers within the computer network;

program code for examining each computer in the set of computers to locate files that are present on the set of computers to form a plurality of located files;

program code for comparing files of the plurality of located files to identify files of the plurality of located files that are present on a plurality of the computers of the set of computers, and to identify files of the plurality of located files that are present on only one of the computers of the set of computers; and program code for displaying a selected one of the files of the plurality of located files that are present on a plurality of the computers of the set of computers or the files of the plurality of located files that are present on only one of the computers of the set of computers.

14. The computer program product of claim 13, further comprising:

program code for applying a common security policy to the set of computers or a centralized database.

15. The computer program product of claim 13, wherein the program code for displaying a selected one of the files of the plurality of located files that are present on a plurality of the computers of the set of computers or the files of the plurality of located files that are present on only one of the computers of the set of computers, comprises:

program code for displaying the selected one of the files of the plurality of located files that are present on a plurality of the computers of the set of computers or the files of the plurality of located files that are present on only one of the computers of the set of computers in a tree format.

16. The computer program product of claim 13, wherein the files of the plurality of located files that are present on a plurality of the computers of the set of computers, comprise files of the plurality of located files that are also located in a same path on each of the computers of the set of computers.

17. An apparatus, comprising:

a memory storing computer usable program code; and a processor for executing the computer usable program code for correlating resources across computers in a computer network for display, wherein the processor executes the computer usable program code to:

identify a set of computers within the computer network;

examine each computer in the set of computers to locate files that are present on the set of computers to form a plurality of located files;

compare files of the plurality of located files to identify files of the plurality of located files that are present on a plurality of the computers of the set of computers, and to identify files of the plurality of located files that are present on only one of the computers of the set of computers; and display a selected one of the files of the plurality of located files that are present on a plurality of the computers of the set of computers or the files of the plurality of located files that are present on only one of the computers of the set of computers.

18. The apparatus of claim 17, wherein the processor further executes the computer usable program code to apply a common security policy to the set of computers or a centralized database.

19. The apparatus of claim 17, wherein the processor executing the computer usable program code to display a selected one of the files of the plurality of located files that are present on a plurality of the computers of the set of computers or the files of the plurality of located files that are present on only one of the computers of the set of computers, comprises:

the processor executing the computer usable program code to display the selected one of the files of the plurality of located files that are present on a plurality of the computers of the set of computers or the files of the plurality of located files that are present on only one of the computers of the set of computers in a tree format.

20. The apparatus of claim 17, wherein the files of the plurality of located files that are present on a plurality of the computers of the set of computers, comprise files of the plurality of located files that are also located in a same path on each of the computers of the set of computers.

\* \* \* \* \*